United States Patent
Brady et al.

(10) Patent No.: US 8,147,968 B2
(45) Date of Patent: Apr. 3, 2012

(54) DILUENTS FOR CROSSLINKER-CONTAINING ADHESIVE COMPOSITIONS

(75) Inventors: Richard L. Brady, Wilmington, DE (US); Qu-Ming Gu, Bear, DE (US); Ronald R. Staib, Hockessin, DE (US)

(73) Assignee: Hercules Incorporated, Wilmington, DE (US)

( * ) Notice: Subject to any disclaimer, the term of this patent is extended or adjusted under 35 U.S.C. 154(b) by 692 days.

(21) Appl. No.: 12/287,394

(22) Filed: Oct. 9, 2008

(65) Prior Publication Data

US 2009/0098387 A1 Apr. 16, 2009

Related U.S. Application Data

(60) Provisional application No. 60/978,571, filed on Oct. 9, 2007.

(51) Int. Cl.
*B32B 21/08* (2006.01)
*B32B 27/10* (2006.01)
*B32B 27/12* (2006.01)
*C08L 3/00* (2006.01)
*B05D 3/10* (2006.01)

(52) U.S. Cl. ............... 428/425.1; 428/537.1; 428/537.5; 428/355 CP; 428/355 N; 524/47; 427/393

(58) Field of Classification Search ............... 428/425.1, 428/317.5, 355 R, 355 CP, 355 N, 537.1, 428/537.5; 524/47; 427/393
See application file for complete search history.

(56) References Cited

U.S. PATENT DOCUMENTS

| | | | |
|---|---|---|---|
| 3,869,296 A | 3/1975 | Kelly, Jr. et al. | 106/214 |
| 3,917,659 A | 11/1975 | Glancy et al. | 260/555 |
| 4,284,758 A | 8/1981 | North | 528/245 |
| 4,343,655 A | 8/1982 | Dodd et al. | 106/214 |
| 4,455,416 A | 6/1984 | Floyd et al. | 528/245 |
| 4,537,634 A | 8/1985 | Floyd | 106/214 |
| 4,853,431 A | 8/1989 | Miller | 524/608 |
| 5,019,606 A | 5/1991 | Marten et al. | 523/417 |
| 5,114,999 A | 5/1992 | Hui et al. | 524/47 |
| 5,171,795 A | 12/1992 | Miller et al. | 525/430 |
| 5,189,142 A | 2/1993 | Devore et al. | 528/339 |
| 5,435,841 A | 7/1995 | Clungeon et al. | 106/287 |
| 5,614,597 A | 3/1997 | Bower | 525/430 |
| 5,786,429 A | 7/1998 | Allen | 525/430 |
| 5,902,862 A | 5/1999 | Allen | 525/430 |
| 6,222,006 B1 | 4/2001 | Kokko et al. | 528/332 |
| 6,554,961 B1 | 4/2003 | Riehle et al. | 162/164.3 |
| 6,908,983 B2 | 6/2005 | Maslanka | 528/310 |
| 7,060,798 B2 | 6/2006 | Li et al. | 530/378 |
| 7,252,735 B2 | 8/2007 | Li | 156/330 |
| 2003/0114631 A1 | 6/2003 | Walton | 528/106 |
| 2005/0245669 A1 | 11/2005 | Clungeon | 524/515 |
| 2008/0021187 A1 | 1/2008 | Wescott et al. | 527/301 |
| 2008/0050602 A1 | 2/2008 | Spraul et al. | 428/479.6 |

FOREIGN PATENT DOCUMENTS

| | | |
|---|---|---|
| EP | 0 447 692 | 9/1991 |
| WO | 2008/089419 | 7/2008 |
| WO | 2008/131071 | 10/2008 |

OTHER PUBLICATIONS

"Colombia Forest Products Launches a Revolution in Plywood Adhesives," Environmental Building News, 14(6),:9,2005).
Brown, Valerie J., "Better Bonding with Beans" in Environmental Health Perspectives, 113 (8):A538-A541 2005.

*Primary Examiner* — Thao T. Tran
(74) *Attorney, Agent, or Firm* — Joanne Mary Fobare Rossi; Robert O'Flynn O'Brien; Wei-Wen Yang

(57) ABSTRACT

The disclosure relates to an adhesive composition for bonding lignocellulosic substrates. The adhesive composition contains a crosslinker and a non-urea diluent where the non-urea diluent is present in an amount from about 0.01 to about 75 weight % based on the total wet weight of the composition and where the crosslinker contains essentially no formaldehyde. Also disclosed is the adhesive further containing. an aqueous mixture of a protein source. The disclosure also relates to a process for making lignocellulosic composites utilizing the disclosed adhesive composition and to the lignocellulosic composites made using the disclosed process.

18 Claims, No Drawings

DILUENTS FOR CROSSLINKER-CONTAINING ADHESIVE COMPOSITIONS

This application claims the benefit of U.S. Provisional Application No. 60/978,571 filed Oct. 9, 2007, the entire contents of which are herein incorporated by reference.

TECHNICAL FIELD

The disclosure relates to an adhesive composition for bonding lignocellulosic substrates. The disclosure also relates to a process for making lignocellulosic composites utilizing the disclosed adhesive composition and to the lignocellulosic composites made using the disclosed process.

BACKGROUND OF THE INVENTION

Wood adhesives made from the combination of a polyamidoamine-epichlorohydrin resin (PAE resin) and soy protein are being used as alternatives to formaldehyde-containing adhesives such as urea-formaldehyde (UF) resins, phenol-formaldehyde (PF) resins and melamine-formaldehyde (MF) resins (U.S. patent application Ser. No. 10/438,147). Performance of the PAE-soy adhesives compares quite favorably to the formaldehyde-containing materials. The PAE/soy adhesive system has been successfully applied to the manufacture of hardwood plywood (Brown, Valerie J., "Better Bonding with Beans" in Environmental Health Perspectives, 113(8): A538-A541, 2005 and "Columbia Forest Products Launches a Revolution in Plywood Adhesives", Environmental Building News, 14(6):9, 2005). However, use of a PAE or other formaldehyde-free crosslinker/soy adhesive system in other wood composite applications such as particleboard, medium density fiberboard (MDF), and oriented strandboard (OSB) requires a lower viscosity adhesive system.

For particleboard, MDF, and OSB, adhesive is generally sprayed onto the wood furnish, which requires a low viscosity adhesive system. Diluting the adhesive with more water to lower viscosity is a limited option, since adding too much water can cause steam blows in the press or require long press times to remove the excess water. For the soy/PAE system, one way to lower viscosity is to lower the viscosity/molecular weight of the PAE resin (U.S. patent application Ser. No. 11/895,122, US20080050602A1). Another way to get lower viscosity while maintaining solids is to use urea as a non-volatile denaturant/diluent to essentially lower the soy level (U.S. patent application Ser. No. 11/779,558, US20080021187A1). Thus, conventional systems utilize urea to provide good performance characteristics; however, a non-urea alternative would be desirable in the market place.

BRIEF SUMMARY OF THE INVENTION

In an embodiment of the invention the adhesive composition for bonding lignocellosic substrates comprises a crosslinker (cross linking agent) and a non-urea diluent and where the non-urea diluent is present in an amount from about 0.01 to about 75 weight % based on the total wet weight of the composition.

The disclosure also relates to an adhesive composition for bonding lignocellulosic substrates where the composition comprises the following components:
(a) an aqueous mixture of a protein,
(b) a crosslinker and
(c) a non-urea diluent
where the non-urea diluent is present in an amount from about 0.01 to about 75 weight % based on the total wet weight of the composition.

The crosslinker is an essentially formaldehyde-free crosslinking agent typically selected from the group consisting of a polyamidoamine-epichlorohydrin resin, a polyamine-epichlorohydrin resin, an isocyanate, an epoxy, an aldehyde starch, an aldehyde, an aldehyde resin and mixtures thereof.

The disclosure also relates to a process for producing lignocellulosic composites utilizing the disclosed adhesive composition. The process involves applying the disclosed adhesive composition to lignocellulosic substrates and forming a composite by curing the adhesive composition. The type of application of the adhesive composition and the forming process vary depending on the type of lignocellulosic composite produced. The adhesive composition is cured by heat.

The disclosure also relates to the lignocellulosic composites produced by the disclosed process.

Unexpectedly, it has been discovered that adding selected non-volatile additives other than urea to essentially formaldehyde-free crosslinker containing adhesive formulations can maintain good adhesive properties while providing lower formulation viscosities which are useful in many applications.

DETAILED DESCRIPTION OF THE INVENTION

The term comprising, and its grammatical variations, as used herein is used in the inclusive sense of "having" or "including" and not in the exclusive sense of "consisting only of". The term "a" and "the" as used herein are understood to encompass the plural as well as the singular.

The term lignocellulosic substrates mean any type of product that contains lignin. Non-limiting examples include groundwood pulp, sawdust, wood particles, wood strand, wood veneer, wood board, wood wafer, wood sheathing.

In an embodiment of the invention the adhesive composition for bonding lignocellosic substrates comprises a crosslinker (cross linking agent) and a non-urea diluent, where the non-urea diluent is present in an amount from about 0.01 to about 75 weight % based on the total wet weight of the composition.

In another embodiment of the invention the adhesive composition for bonding lignocellosic substrates comprises:
(a) an aqueous mixture of a protein
(b) a crosslinker and
(c) a non-urea diluent
where the crosslinker is an essentially formaldehyde-free crosslinking agent and where the non-urea diluent is present in an amount from about 0.01 to about 75 weight % based on the total wet weight of the composition The protein is present in the amount from about 0.01 to about 50 wt. %, preferably 0.1 to 20 wt %, more preferably 1 to 15 wt. % based on the total wet weight of the composition. When calculating percent of protein, the protein is the actual amount of protein found in the protein source, for example, soy flour is generally about 50 wt. % protein, dry basis. Protein-based adhesives are well known in the art. Suitable protein sources for use in the present invention include casein, blood meal, feather meal, keratin, gelatin, collagen, gluten, wheat gluten (wheat protein), whey protein, zein (corn protein), rapeseed meal, sunflower meal and soy.

Soy is a particularly useful source of protein for the current invention. Soy can be used in the form of soy protein isolates, soy flour, soy meal or toasted soy. Soy protein is commonly obtained in the form of soy flour (about 50 wt. % protein, dry basis) by grinding processed soy flakes to a 100-200 mesh. The soy flour can be further purified (usually by solvent extraction of soluble carbohydrates) to give soy protein concentrate which contains about 65 wt. % protein, dry basis. Defatted soy can be further purified to produce soy protein isolate (SPI), which has a protein content of at least about 85 wt. %, dry basis.

Soy flour suitable for use in adhesives can be obtained by removing some or most of the oil from the soybean, yielding a residual soy meal that was subsequently ground into extremely fine soy flour. Typically, hexane is used to extract the majority of the non-polar oils from the crushed soybeans, although extrusion/extraction methods are also suitable means of oil removal. Residual hexane in the extracted soy flakes is typically removed by one of two processes: a desolventiser toaster (DT) process or by using a flash desolventiser system (FDS). The use of the DT process results in a more severe heat treatment of the soy (maximum temperature of about 120° C.; 45-70 minutes residence time) than the FDS process (maximum temperature of about 70° C.; 1-60 seconds residence time). The DT process results in a darker product, typically referred to as soy meal or toasted soy. Soy meal or toasted soy will be used interchangeably to refer to soy products processed by the DT method.

The ability of the protein portion of the soy product to be dissolved or dispersed in water is measured by the Protein Dispersibility Index (PDI) test. This test has been described as follows: a sample of soybeans is ground, mixed in a specific ratio with water, and blended at a set speed (7,500 rpm) for a specific time (10 minutes). The nitrogen content of the ground soybeans and of the extract are determined using the combustion method. The PDI value is the quotient of the nitrogen content of the extract divided by the nitrogen content of the original bean.

The protein portion of DT-processed soy products have a lower solubility/dispersibility in water than the soy products processed by the FDS method as indicated by lower PDI values. Soy meals (toasted soy), typically have PDI values of 20 or less, whereas the FDS-processed soy products have PDI values ranging from 20 to 90.

The protein used in the invention may be pretreated or modified to improve its solubility, dispersibility and/or reactivity. For example, soy protein may be used as produced or may be further modified to provide performance enhancements. U.S. Pat. No. 7,060,798, the entire content of which is herein incorporated by reference, teaches methods of modifying protein and their incorporation in to an adhesive.

The crosslinker (b) is an essentially formaldehyde-free crosslinking agent. The crosslinking agent may be at least one selected from polyamidoamine-epichlorohydrin resins (PAE resins), polyamine-epichlorohydrin resins, isocyanates, epoxies, aldehyde starches, aldehydes, aldehyde resins, and mixtures thereof. Aldehyde starches include dialdehyde starch as well as other starches that contain aldehyde-functional groups. Aldehyde resins include glyoxal-based crosslinkers and glyoxalated polyacrylamides. Examples of useful aldehydes are glyoxal and glutaraldehyde. Examples of aldehyde functional resin crosslinkers include Sequarez® 755 (RohmNova, Mogadore, Ohio), PPD M-5054® (Hercules Incorporated, Wilmington, Del.), and glyoxalated polyacrylamides such Hercobond® 1000 (Hercules Incorporated, Wilmington, Del.). The crosslinker is present in the amount from about 0.01 to about 50 wt. % based on the total weight of the composition.

PAE resins are available commercially from a number of suppliers including Hercules Incorporated, Wilmington Del. The PAE resins are made in a two-step process in which a polyamidoamine is first prepared by the polycondensation of a polyalkylenepolyamine with a polycarboxylic acid, typically involving the reaction of diethylenetriamine (DETA) and adipic acid. Several methods of preparing polyamidoamines have been disclosed that provide control over the polyamidoamine molecular weight and structure. These include the use of monofunctional endcapping agents to control molecular weight, disclosed in U.S. Pat. No. 5,786,429, U.S. Pat. No. 5,902,862 and U.S. Pat. No. 6,222,006, all of which are incorporated by reference. Another technique for controlling the molecular weight of a polyamidoamine is discussed in U.S. Pat. No. 6,908,983 and in U.S. Pat. No. 6,554,961.

The polyamidoamine is then reacted in aqueous solution with epichlorohydrin to produce the PAE resin. The preparation of thermosetting PAE resins, is described in U.S. Pat. Nos. 4,853,431, 5,019,606, 5,171,795, 5,189,142, 5,189,142 and 5,614,597.

Crosslinking resins based on glyoxal are known in the art, see for example U.S. Pat. Nos. 3,869,296, 3,917,659 and 4,471,487. A glyoxal-urea binder composition is described in U.S. Pat. No. 5,435,841. U.S. Pat. No. 5,395,440 describes a glyoxal-urea binder that also contains an alkali metal salt of an oxygenated boron acid and calcium hydroxide. U.S. Pat. No. 4,284,758 discloses alkylated glyoxal/cyclic urea condensates that are excellent formaldehyde-free crosslinking resins for textile fabrics. U.S. Pat. No. 4,343,655 describes resins in which glyoxal is reacted with a cyclic urea.

A binder prepared from glyoxal and a polyhydroxy compound is described in U.S. Pat. No. 5,114,999. Cyclic urea/glyoxal/polyol condensates and their use in treating textile fabrics and paper are described in U.S. Pat. No. 4,455,416. Paper coating compositions are described in U.S. Pat. No. 4,537,634 which contain an insolubilizer for the binder made from glyoxal and a vicinal polyol.

The non-urea diluents (c) are low volatility, water-soluble or water-dispersible compounds that give low viscosity in water. Non-limiting compounds include diethylene glycol, propylene glycol, 2-methoxyethanol, glycerol and glycerol derivatives, ethylene carbonate, propylene carbonate, methylpyrollidone, low molecular weight polyethylene glycol and derivatives like methoxy polyethylene glycol, sucrose, lactose, sorbitol, maltodextrin, cyclodextrin, a carbohydrate, syrups and hydrolyzed low molecular weight polysaccharides or oligosaccharides, inorganic salts such as sodium sulfate, sodium phosphate, sodium chloride and alum, bentonite, an aluminosilicate, an alkali metal aluminosilicate, water soluble organic compounds such as formamide and acetamide, N-methylpyrrolidinone, surfactants, emulsifiers, oils such as vegetable oil, silicon oil, mineral oils and other oils and mixtures of the above.

In one embodiment of the invention the diluent is a compound that contains alcohol functionality. Preferably the diluent contains multiple alcohol functionality on the same molecule such as diols and polyols.

In some embodiments of the invention the preferred non-urea diluents are glycerol, sucrose, sorbitol, corn syrup, and hydrogenated corn syrup.

The non-urea diluent is present in an amount of from about 0.01 to about 75% by weight based on the total wet weight of the adhesive composition. Typically, the non-urea diluent is present in an amount from about 5 to about 60% by weight and more typically from about 10 to about 50% by weight based on the total wet weight of the adhesive composition.

In another embodiment, non-urea diluents can be used with crosslinkers without the presence of protein. The non-urea diluent, acting as a carrier for the crosslinker, can increase the solids of the adhesive system as well as decrease the cost. The non-urea diluent is present in an amount of from about 0.01 to about 90% by weight based on the total wet weight of the adhesive composition. U.S. patent application Ser. No. 11/467,669 presents no-protein systems of azetidinium resin with urea.

In other embodiments of the disclosure at least one auxiliary additive (d) may be added to the disclosed adhesive composition.

Auxiliary additives that may be included in the adhesive composition include extenders, viscosity modifiers, defoamers, biocides, and fillers such as wheat flour, tree bark flour, nut shell flour and corn cob flour.

The components of the adhesive composition are combined in a suitable mixer and are stirred until a homogeneous mixture is obtained. Various orders of addition can be employed. For example, the protein source, such as soy flour, can be added to water, followed by diluent. Alternatively, the diluent can be added to water, followed by the protein source. Heat treatment of the protein source/water/diluent mixtures is optional. The crosslinker is typically added close to the time of application, since certain crosslinkers can have limited stability in the formulation.

The adhesive compositions are typically prepared with solids contents in the range of 5 to 75 wt. %, more typically in the range of 10 to 65 wt. % and most typically in the range of 20 to 60 wt. %. The most effective ratio of crosslinker to protein in the adhesive composition will depend on the substrate being bonded, the type of protein used and the physicochemical properties of the crosslinker. The weight ratio of protein to crosslinker used in adhesive formulations will be typically in the range of 100:1 to 0.1:1, more typically in the range of 25:1 to 0.5:1 and most typically in the range of 20:1 to 1:1 (dry weight). When calculating ratio of protein to crosslinker, the protein is the actual amount of protein found in the protein source.

The pH of the adhesive composition may be adjusted to control the reactivity of the adhesive composition which is thermosetting. The curing temperature and pH can be used to control cure times which will vary depending upon the application. The pH is typically in the range of about 5 to 10. For example, PAE resins are more reactive in the near neutral to alkaline range of about pH 6 to 10 and generally adjusting the pH to this range will give increasing reactivity.

As noted above, the adhesive compositions are thermosetting materials and as such are cured by the application of heat, and optionally, pressure. Typical temperatures for curing the adhesive compositions are in the range of 50 to 250° C., more typically in the range of 80 to 200° C. and most typically in the range of 100 to 180° C. Curing times at these temperatures can range from 20 seconds to one hour, more typically from one minute to 30 minutes and most typically from 2 minutes to 10 minutes.

Optionally applied pressure ranges from about atmospheric pressure to about 1000 psi. Typically pressures in the range from about 25 to about 500 psi and more typically from about 25 to about 250 psi are used.

The viscosity of the adhesive composition is typically in the range from about 10 to about 100,000 cps (as measured by Brookfield Viscometer with spindle 2 at 30 rpm) and more typically in the range from about 20 to about 20,000 cps and even more typically from about 30 to about 10,000 cps. Appropriate viscosity is dependent on the specific application.

Another embodiment of the disclosure involves a process for making lignocellulosic composites. The process involves applying the adhesive composition to a lignin containing substrate and curing the adhesive composition to form a lignin containing composite.

The adhesive compositions of the present invention are added to suitable substrates in the range of 1 to 25% by weight, preferably in the range of 1 to 12% by weight and most preferably in the range of 2 to 10% by weight based on the total weight of the adhesive composition and substrate.

The adhesive composition can be applied by the use of roller coating, knife coating, extrusion, curtain coating, foam coaters and spray coaters, one example of which is the spinning disk resin applicator. The lower viscosity compositions in the present disclosure are particularly useful for spray coating and spinning disk application, such as in particleboard, MDF, and oriented strandboard applications.

The adhesive composition of the disclosure can be used in the manufacture of hardwood plywood, particleboard, MDF, and oriented strandboard. The composition is particularly useful for particleboard, MDF, and oriented strandboard, where lower viscosity formulations are often utilized.

For example, to produce plywood the adhesive composition may be applied onto veneer surfaces by roll coating, knife coating, curtain coating, or spraying. A plurality of veneers is then laid-up to form sheets of required thickness. The composed panel may then optionally be pressed at ambient temperature to consolidate the structure (cold pressing). This can be performed at a pressure from 25 to 250 psi for 1 to 10 minutes. The mats or sheets are then placed in a heated press (e.g., a platen) and compressed to effect consolidation and curing of the materials into a board. Hardwood plywood may also be manufactured by gluing a hardwood surface veneer to a substrate such as particle board, oriented strand board (OSB), waferboard, fiberboard (including medium-density and high-density fiberboard), parallel strand lumber (PSL), laminated strand lumber (LSL) and other similar products.

For particleboard, MDF, and oriented strandboard, the adhesive composition is generally applied to the furnish by spraying or spinning disk, followed by layup in face-core-face layers, then partial consolidation at room temperature and final consolidation in a heated press. The composition should be low enough in viscosity for effective spraying or spinning disk application onto the furnish. Preferably the viscosity for spraying or spinning disk applications is less than 10,000 centipoise and more preferably the viscosity is less than 5000 centipoise.

The use of low volatility non-urea diluents allows the production of lower viscosity soy/crosslinker adhesive formulations at equivalent solids or higher solids formulations at equivalent viscosity. These additives have the further advantage over urea in that the soy flour does not have to be pre-cooked to remove urease, which leads to ammonia formation in formulations with urea. Furthermore, certain non-urea additives, such as for example, the diols or polyols, provide better retention of adhesive strength when used to replace the urea.

The following examples are for illustrative purposes only and are not intended to limit the scope of the claims.

GENERAL PROCEDURE FOR THE EXAMPLES

The following procedures/tests were used for the examples.

(1). Brookfield viscosity (BV) was measured using a DV-II Viscometer (Brookfield Viscosity Lab, Middleboro, Mass.). A selected spindle (number 2) was attached to the instrument, which was set for a speed of 30 RPM. The Brookfield viscosity spindle was inserted into the formulation so as not to trap any air bubbles and then rotated at the above-mentioned speed for 3 minutes at 24° C. The units are in centipoises (cps).

(2) Adhesion strength: Adhesion strength was measured using the Automated Bonding Evaluation System (ABES, from AES, Inc., Corvallis, Oreg.). Maple veneer strips, 20 mm×117 mm (parallel to grain)×0.7-0.8 mm (thickness) were pressed together in the machine in lap shear configuration. Overlap area was 5 mm, with cure time 2 min at 121 C, and 2 MPa pressure in the overlap area. Following cure, the samples were air cooled for 8 sec in the machine, followed by lap shear testing in the machine. For wet adhesion strength, samples were removed after pressing and curing, soaked for 1 hr at room temperature in DI water, and then removed from the water and tested wet in the machine. One hr soak was found adequate to completely wet the bond line. Adhesion strengths are given in breaking load/overlap area (psi).

(3) Particleboard panels: Small panels (10 in×10 in) were produced in the lab by placing core furnish (internal bond testing) or face furnish (modulus of rupture —MOR testing) in a rotating drum (2 ft diameter×1 ft wide, with baffles). Adhesive was sprayed onto the rotating furnish using a peristaltic pump and an air atomizing nozzle. Panels were formed in a 10 in×10 in plexiglass form and prepressed with a metal plate. The preformed mat was pressed in a 12 in×12 in Carver press with 11/16 in (core) or ½" (face) bars on both sides for thickness stops. Cure time was 5 min at 170 C. For internal bond testing, the center 3 in×3 in was cut out of the cooled panels, and (9) 1 in×1 in pieces were cut for internal bond (IB) testing. IB testing was done similar to ASTM D1037-99. Each piece was measured for weight, length, width, and thickness to get density averages. Aluminum tabs were glued to the pieces with hot melt adhesive (Cool-Lok 34-250A, National Starch, Bridgewater, N.J.) and allowed to cool. IB tests were done with a Shimpo force gauge and results averaged over 9 samples. For MOR testing, (8) 8 in×1 in pieces were cut and MOR testing done similar to ASTM D1037-99. Span was 6 in, and testing was done with a Shimpo force gauge. Each piece was measured for weight, length, width, and thickness to get densities. MOR vs density was plotted for each formulation and the data fit to a straight line and normalized to 44 pcf.

Examples 1-15

For examples 1-13, 20 g soy flour (Prolia 200/20 or Prolia 100/90) was mixed with 90 g water. Samples were then either heat treated or not heat treated. Heat treatment consisted of heating the soy mixture at 80° C. for 30 min, cooling to 50° C., and holding at 50° C. for 1 hr. Diluents (40 g) were then added to the soy mixtures, along with 0.1% Proxel® GXL (Arch Chemicals, Norwalk, Conn.) as a preservative (except for Example 1). Overall solids was 40% for the examples, except where noted. The soy flour formulation with soybean oil (Example 13) was prepared by stirring the mixture at 23° C. for 5 minutes to form a stable emulsion. Viscosity was measured by Brookfield viscometer with spindle 2 at 30 rpm. The data is presented in Table I.

The viscosities listed in Table I indicate low viscosity, flowable formulations for examples 1-13. Completed adhesive compositions of the invention can be made simply by adding crosslinker, giving overall low viscosities. In contrast, a 40% solids mixture of just soy flour and water (example 14, no diluent) is thick and does not flow at all. In order to get similar viscosity without diluent, solids level must be near 13.3% (Example 15). The viscosities using diluents of this invention (Examples 2-13) are lower than that for urea as a diluent (Example 1).

TABLE I

Diluent viscosity data

| Example | Soy Flour | Diluent | Heated | Viscosity, cps |
|---|---|---|---|---|
| 1 (comparative) | 200/20 | urea | yes | 565 |
| 2 | 200/20 | sucrose | yes | 478 |
| 3 | 200/20 | sucrose | no | 76 |
| 4 | 200/20 | glycerol | yes | 250 |
| 5 | 200/20 | glycerol | no | 30 |
| 6 | 200/20 | NaCl | yes | 487 |
| 7 | 200/20 | NaCl | no | 28 |
| 8 | 100/90 | sucrose | no | 520 |
| 9 | 100/90 | glycerol | no | 232 |
| 10 | 100/90 | NaCl | no | 240 |
| 11 | 100/90 | Na2SO4 (45% solids) | no | 450 |
| 12 | 100/90 | CH3CO2Na | no | 250 |
| 13 | 100/90 | Soybean oil | no | 380 |
| 14 (comparative) | 100/90 | None (40% solids) | no | Not flowable |
| 15 (comparative) | 100/90 | None (13.3% solids) | no | 580 |

Examples 16-28

Examples 16-27 utilize soy+diluent mixtures of Examples 1-11 and 15. Example 16 is the urea control, while example 27 is the no-diluent control. For each example except for 28 (no PAE), 10% PAE resin crosslinker (Chemvisions CA1000, 100 cps, Hercules Incorporated) based on resin solids to soy+diluent solids was mixed with the soy+diluent mixture on the day of ABES testing. For example for each 100 gm of soy+diluent solids, 10 grams of PAE solids was added. The pH of the CA1000 was adjusted to 6.5-7.0 with 10% NaOH before use. Adhesion strengths were monitored for up to 11 days as indication of stability of the soy+diluent mixture. Dry and wet adhesion results (ABES) are given in Table II in psi. Example 28 shows that very little wet adhesion is produced by soy flour without the crosslinker. The remaining examples have crosslinker (PAE) present.

TABLE II

ABES Adhesion strengths in psi

| Example | Soy/Diluent from Ex. | Additive | Dry, 1 day | Wet, 1 day | Dry, 5 days | Wet, 5 days | Dry, 10 days | Wet, 10 days | Dry, 11 days | Wet, 11 days |
|---|---|---|---|---|---|---|---|---|---|---|
| 16 | 1 | Urea-heat | 763 | 274 | | | | | 769 | 337 |
| | | SD | 45 | 45 | | | | | 55 | 31 |
| 17 | 2 | Sucrose-heat | 842 | 406 | | | | | 979 | 432 |
| | | SD | 54 | 63 | | | | | 127 | 38 |

TABLE II-continued

ABES Adhesion strengths in psi

| Example | Soy/Diluent from Ex. | Additive | Dry, 1 day | Wet, 1 day | Dry, 5 days | Wet, 5 days | Dry, 10 days | Wet, 10 days | Dry, 11 days | Wet, 11 days |
|---|---|---|---|---|---|---|---|---|---|---|
| 18 | 3 | Sucrose | 822 | 336 | | | | | 849 | 366 |
| | | SD | 26 | 28 | | | | | 79 | 65 |
| 19 | 4 | Glycerol-heat | 1018 | 535 | | | | | 1117 | 522 |
| | | SD | 39 | 103 | | | | | 49 | 47 |
| 20 | 5 | Glycerol | 905 | 503 | | | | | 823 | 228 |
| | | SD | 39 | 32 | | | | | 132 | 146 |
| 21 | 6 | NaCl-heat | 486 | 22 | | | | | | |
| | | SD | 25 | 22 | | | | | | |
| 22 | 7 | NaCl | 458 | 49 | | | | | | |
| | | SD | 55 | 10 | | | | | | |
| 23 | 8 | Sucrose | | | 745 | 245 | 677 | 247 | | |
| | | SD | | | 17 | 36 | 57 | 31 | | |
| 24 | 9 | Glycerol | | | 1003 | 410 | 919 | 327 | | |
| | | SD | | | 114 | 56 | 65 | 37 | | |
| 25 | 10 | NaCl | | | 503 | 2 | | | | |
| | | SD | | | 34 | 4 | | | | |
| 26 | 11 | sodium sulfate | 820 | 310 | | | | | | |
| 27 | 14 | none | 899 | 394 | | | | | | |
| | | SD | 51 | 14 | | | | | | |
| 28 | 14 | none, no PAE | 697 | 12 | | | | | | |
| | | SD | 73 | 5 | | | | | | |

SD = standard deviation

The data listed in Table II shows that diluents other than urea can maintain wet and dry adhesion compared with the no additive control just as well or better than urea. This result is unexpected in that conventional techniques rely on the use of urea for lowering viscosity and maintaining strength. Sucrose and glycerol work well with 200/20 soy flour (heated and unheated) as well as with 100/90 flour (unheated). Sodium chloride causes a large reduction in adhesion, whereas other salts such as sodium sulfate can maintain adhesion. Adhesion of the sucrose and glycerol mixtures with soy maintains good performance for at least 10 days. This is in addition to being low viscosity solutions at high solids (Table I).

Examples 29-33

Examples 29-33 utilize soy oil and combinations of glycerol with sodium sulfate or sodium chloride as diluents. Example 29 is the urea, made as in Example 1. For Example 30, 13.3 g Prolia 100/90 was mixed with 26.7 g soy oil and 60 g of water. For Example 31, 13.3 g Prolia 100/90 was mixed with 13.3 g glycerol, 13.3 g NaCl, and 60 g of water. For Example 32, 13.3 g Prolia 100/90 was mixed with 13.3 g glycerol, 13.3 g sodium sulfate, and 60 g water. For Example 33, 22 g Prolia 100/90 was mixed with 12 g glycerol, 12 g sodium sulfate, and 54 g water. For Examples 29-33, 1 g of PAE resin crosslinker solids (Chemvisions CA1000, Hercules Incorporated) was mixed with 10 g of soy+diluent solids on the day of ABES testing. Dry and wet adhesion results (ABES) are given in Table III in psi.

TABLE III

ABES Adhesion Strengths

| Examples | Diluents | Total solids (%) | Dry (psi) | Wet (psi) |
|---|---|---|---|---|
| 29 | Urea | 40 | 778 | 322 |
| 30 | Soybean oil | 40 | 765 | 389 |

TABLE III-continued

ABES Adhesion Strengths

| Examples | Diluents | Total solids (%) | Dry (psi) | Wet (psi) |
|---|---|---|---|---|
| 31 | Glycerol-NaCl (1:1) | 40 | 498 | 73 |
| 32 | Glycerol-Na2SO4 (1:1) | 40 | 645 | 229 |
| 33 | Glycerol-Na2SO4 (1:1) | 46 | 809 | 279 |

Example 30 shows that wet adhesion is improved with the soy flour/soy oil emulsion relative to that of the urea/soy flour combination (Example 29) in this set of evaluations. Example 31 shows that very little wet adhesion is produced by soy flour with glycerol in the presence of sodium chloride. Examples 32 and 33 show that glycerol-sodium sulfate combinations give much better adhesive performance than the glycerol-sodium chloride combination.

Examples 34-39

Examples 34-39 demonstrate production of particleboard panels with various formulations of the invention as well as urea-containing controls. Table IV shows the adhesive formulations, as well as the resulting panel density and IB data. 7.25% adhesive (solids to solids basis) was sprayed onto the wood furnish for each panel. Diluent/soy was 2:1 (solids to solids basis) in all cases. Examples 34-35 were heat treated as in Example 16, while examples 36-39 utilized Prolia 100/90 soy flour with no heat treatment, as in Example 24. No pH adjustments were made to the adhesive formulations or crosslinkers, except for adjustment of the adhesive to pH 10 for example 39.

The Table demonstrates the ability to make particleboard at high solids utilizing a glycerol diluent. No cooking/heat treatment of the formulation is necessary. Unexpectedly, internal bond strengths with glycerol formulations were higher than that for urea-containing formulations at similar panel densities.

TABLE IV

Particleboard panels for IB

| Example | Diluent | Dil. + Soy % Solids | Cross-linker | Adhesive % Solids | Density, pcf | IB, psi |
|---|---|---|---|---|---|---|
| 34 | urea | 40 | 10% CA1000 | 36.7 | 40.8 | 35 |
| 35 | urea | 45 | 10% CA1000 | 40.4 | 40.1 | 48 |
| 36 | glycerol | 50 | 10% CA1000 | 44 | 43.3 | 86 |
| 37 | glycerol | 50 | 5% CA1000 5% SR755 | 47 | 41.4 | 68 |
| 38 | glycerol | 50 | 5% CA1000 5% M-5054 | 46.6 | 42.6 | 55 |
| 39 | glycerol | 58.8 | Kymene 450 ®, pH 10 | 50 | 40.2 | 67 |

Example 40

Example 40 (Table V) demonstrates an embodiment of the invention with no protein. The adhesive mixture was 200 g of PAE resin (CA1300, 30% solids) plus 180 g glycerol. Viscosity was with spindle #2, 30 rpm. Particleboard was made with face furnish, followed by MOR testing. 10.8% adhesive was sprayed on the furnish. A good panel resulted with MOR equal to that of a urea-formaldehyde resin+catalyst control (1855 psi).

TABLE V

Particleboard panels for MOR

| Example | Diluent | Dil. + Soy % Solids | Cross-linker | Adhesive % Solids | Visc., cps | MOR at 44 pcf psi |
|---|---|---|---|---|---|---|
| 40 | glycerol | 100 (no soy) | 25% CA1300 | 63.1 | 511 | 1863 |

Example 41

This example demonstrates use of a low PDI flour with non-urea diluent to make a high solids mixture that can be used with crosslinker. Mixing glycerol, water, and ADM Kaysoy (a toasted soy) at a glycerol/soy ratio of 2/1 and 66% total solids gave a homogeneous product with viscosity (spindle 4, 30 rpm) of 6160 cps.

The foregoing description illustrates and describes the present disclosure. Additionally, the disclosure shows and describes only the preferred embodiments of the disclosure, but, as mentioned above, it is to be understood that it is capable of changes or modifications within the scope of the concept as expressed herein, commensurate with the above teachings and/or skill or knowledge of the relevant art. The embodiments described hereinabove are further intended to explain best modes known of practicing the invention and to enable others skilled in the art to utilize the disclosure in such, or other, embodiments and with the various modification required by the particular applications or uses disclosed herein. Accordingly, the description is not intended to limit the invention to the form disclosed herein. Also, it is intended that the appended claims be construed to include alternative embodiments.

All publications, patents and patent applications' cited in this specification are herein incorporated by reference, and for any and all purposes, as if each individual publication, patent or patent application were specifically and individually indicated to be incorporated by reference. In the case of inconsistencies, the present disclosure will prevail.

What is claimed:

1. An adhesive composition consisting essentially of a crosslinker, a non-urea diluent, and an aqueous mixture of a protein source, wherein the non-urea diluent is present in an amount from about 0.01 to about 75 weight % based on the total wet weight of the composition and wherein the crosslinker contains essentially no formaldehyde.

2. The adhesive composition as claimed in claim 1, wherein the aqueous mixture of a protein source is obtained from a mixture of water and at least one product selected from the group consisting of soy flour, soy protein concentrate, soy protein isolate and mixtures thereof.

3. The adhesive composition as claimed in claim 1, wherein the crosslinker is selected from the group consisting of a polyamidoamine-epichlorohydrin resin, a polyamine-ephichlorohydrin resin, an isocyanate, an epoxy, an aldehyde starch, an aldehyde, an aldehyde resin and mixtures thereof.

4. The adhesive composition of claim 1, wherein the non-urea diluent is at least one selected from the group consisting of diethylene glycol, propylene glycol, 2-methoxyethanol, glycerol, a glycerol derivative, ethylene carbonate, propylene carbonate, methyl pyrollidone, low molecular weight polyethylene glycol and derivatives like methoxy polyethylene glycol, sucrose, lactose, sorbitol, maltodextrin, cyclodextrin, a carbohydrate, syrups and hydrolyzed polysaccharide, an inorganic salt, sodium sulfate, sodium phosphate, sodium chloride, alum, bentonite, an aluminosilicate, an alkali metal aluminosilicate, a water soluble organic compound, formamide, acetamide, N-methylpyrrolidinone, a surfactant, an emulsifier, an oil, vegetable oil, silicon oil and mineral oil.

5. The adhesive composition of claim 1, wherein the non-urea diluent is selected form the group consisting of glycerol, sucrose, corn syrup, sorbitol, hydrogenated corn syrup and mixtures thereof.

6. The adhesive composition of claim 1, wherein the protein in the protein source is present in an amount of from about 0.01% to about 50 weight % based on the total wet weight of the adhesive composition.

7. The adhesive composition of claim 1, wherein the crosslinker is present in an amount of from about 0.01% to about 50 weight % based on the total wet weight of the adhesive composition.

8. The adhesive composition of claim 1, wherein the non-urea diluent is present in an amount of from about 5 to about 60% by weight based on the total wet weight of the adhesive composition.

9. The adhesive composition of claim 1, wherein the crosslinker is a polyamidoamine-epichlorohydrin.

10. The adhesive composition of claim 1, wherein the adhesive composition has solids content in the range from about 5 to about 75 weight %.

11. The adhesive composition of claim 1, wherein the weight ratio of protein to crosslinker is in the range of about 100:1 to about 0.1:1.

12. A method for producing a lignocellulosic composite comprising applying the adhesive composition of claim 1, to a lignocellulosic substrate and curing the adhesive composition to form the lignocellulosic composite.

13. The method of claim 12, wherein the adhesive composition is applied to the lignocellulosic substrate at a concentration of from about 1 to about 25 weight % based on the total weight of the adhesive composition and the lignocellulosic substrate.

14. The method of claim 12, wherein pressure is applied during curing and wherein the pressure ranges from about atmospheric pressure to about 1000 psi.

15. The method of claim 12, wherein the adhesive composition is cured at a temperature from about 50 to about 250° C.

16. The method of claim 12, wherein the lignocellulosic substrate is at least one selected from the group consisting of groundwood pulp, sawdust, wood particles, wood strand, wood veneer, wood board, wood wafer and wood sheathing.

17. A lignocellulosic composite obtained from the process of claim 12.

18. The lignocellulosic composite of claim 17, wherein the lignocellulosic composite is selected from the group consisting of hardwood plywood, particleboard, medium density fiberboard, oriented strandboard, waferboard, fiberboard, parallel strand lumber, laminated strand lumber and a hardwood veneered product.

\* \* \* \* \*